Oct. 4, 1938.     W. A. BLUME     2,131,932
FRICTION ELEMENT
Filed March 4, 1937

Inventor:
William A. Blume
By: Bell and Wallace
Atty's.

Patented Oct. 4, 1938

2,131,932

UNITED STATES PATENT OFFICE

2,131,932

FRICTION ELEMENT

William A. Blume, Detroit, Mich., assignor to The American Brake Shoe and Foundry Company, a corporation of Delaware Application March 4, 1937, Serial No. 128,971

15 Claims. (Cl. 188—259)

This invention relates to friction elements and more particularly to friction elements comprising a composition body of either woven or molded material, and the primary object of the invention is to so mount such friction elements that uniform seating thereof against a cooperating surface will be assured.

In many devices wherein it is desirable to effect deceleration a disc is provided against the periphery of which means to effect deceleration are forced and usually the means effecting such deceleration are mounted on a band disposed about the periphery of the disc, the band being so arranged that the means mounted thereon will be forcibly brought to bear upon the disc to thereby effect the desired deceleration when the band is moved toward the periphery of the disc. Thus another object of my invention is to enable a plurality of friction elements to be mounted on the inner surface of a band in such a manner that the elements may be uniformly brought to bear upon the periphery of the disc when the band carrying such elements is moved toward the disc whereby deceleration of the disc will be effected.

In arrangements such as the foregoing it is often customary to fixedly mount one end of a band disposed about the periphery of a disc and to provide means for moving the other end of the band in such a manner that the band will be moved uniformly toward the periphery of the disc throughout its length. However, in such arrangements it is quite difficult to insure uniform movement of the band toward the disc and frequently because of this difficulty certain of the friction elements or portions of the friction elements mounted on the band intermediate the band and the disc wear more rapidly than other of the friction elements or portions of the friction elements, and a further object of my invention is to insure uniform wear of friction elements mounted in the aforesaid manner.

More specific objects of my invention are to mount a friction element at its center rather than near its ends in such a manner that the friction element is capable of compensatory movement to insure uniform seating thereof; to facilitate installation and removal of friction elements mounted in the aforesaid manner; and to provide a novel mounting for friction elements of simple and economical construction and which will effect proper and positive positioning of the friction elements.

Other and ancillary objects will be apparent from the following description wherein reference is made to the accompanying drawing in which selected embodiments of my invention are illustrated and wherein—

Figure 1:
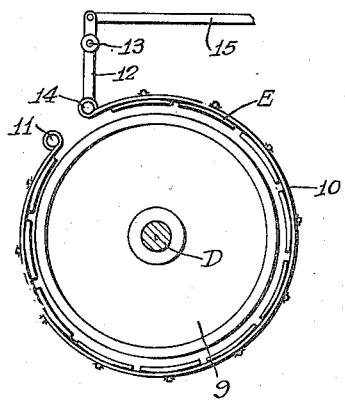
Fig. 1 is an elevational view of a typical apparatus embodying my invention.

In the drawing, D is a shaft which is representative of a device to be decelerated and on which a disc or drum 9 is fast. A flexible band 10 is disposed about the periphery of the disc 9 in spaced relation therewith and one end of the band is connected to a fixed member 11. One end of a lever 12 fulcrumed at 13 is connected to the other end of the band 10 as indicated at 14, and a link 15 is connected to the other end of said lever 12. When the link 15 is moved to the right, as viewed in Fig. 1, the band 10 is moved toward the periphery of the disc 9 whereby the friction elements E mounted on the band intermediate the band and the periphery of the disc are brought into frictional engagement with the disc to effect deceleration of the disc 9 and shaft D. My invention particularly pertains to mounting the elements E on the band 10.

Figure 2:
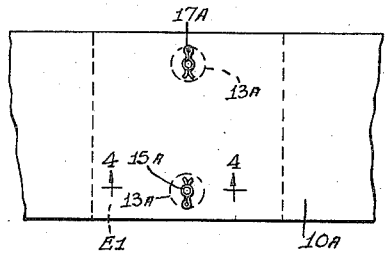
Fig. 2 is a fragmentary top plan view of one form of my invention.
Figure 3:
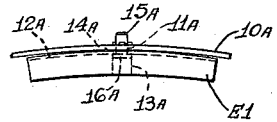
Fig. 3 is a fragmentary side elevation of the form of my invention shown in Fig. 2.
Figure 4:
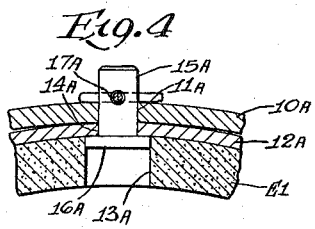
Fig. 4 is an enlarged sectional detail view.

Thus in the form of my invention shown in Figs. 2, 3 and 4, the band 10A has pairs of openings 11A provided therein at spaced intervals longitudinally therealong, the openings 11A being aligned transversely of the band 10A and being spaced one from the other and the edges of the band. The friction element E1 includes a composition body of either woven or molded material mounted on a suitable reenforcing 12A. Openings 13A extend through the composition body of the element E1 intermediate and preferably midway between the ends thereof in transverse alignment with each other and are spaced one from the other and the side edges of the element, the spacing between the openings 13A corresponding to the spacing between the openings 11A in the band 10A. Other openings 14A are provided in the backs 12A in alignment with the openings 13A but the openings 14A are of less diameter than the openings 13A.

Studs 15A including enlarged heads 16A are passed through the openings 13A, 14A and 11A so as to project beyond the outwardly disposed face of the band 10A. In those portions of the studs 15A extending beyond the outwardly disposed face of the band 10A are transversely extending openings through which cotter pins 17A or other suitable securing means are extended to prevent displacement of the studs 15A from the openings 11A and 14A. The enlarged heads 16A of the studs 15A are thereby clamped against the back 12A wherefore the friction element E1 is connected to the band 10A.

The friction elements as E1 are arcuate longitudinally to conform to the periphery of the disc 9 when clamped thereagainst and the arcuate front and rear faces of the elements are parallel one with the other. Thus if when the band 10A is disposed out of operative relation with the periphery of the disc 9 and the arcuate configuration of the band does not conform to the arcuate configuration of the elements, the back of the elements and the adjacent portion of the band except at the point of interconnection therebetween, which is substantially midway between the ends of the element, will be in spaced relation. The location and nature of the interconnection of the elements and band afforded by the studs as 15A and the location thereof relative to the extent of the element is such that as the band 10 moves toward the periphery of the disc 9 and the elements come into engagement with the periphery of the disc, the elements will rock on the band to adjust their position such that the faces of the elements will neatly and uniformly seat against the periphery of the disc, whereby uniform wearing away of the faces of the elements is assured. This is in contradistinction to what might result if the elements were not capable of moving relatively to the band, in which instance in all probability one or the other of the ends of the elements would first engage the drum. This engagement might be such that all of the wear would occur on the end first moving into engagement with the periphery of the disc. This latter condition would not only result in greater wear at one end of the element than at the other but would also reduce the area of the element in engagement with the periphery of the drum, which would impair operation inasmuch as the highest efficiency is realized only when the entire faces of the elements engage the periphery of the disc.

Figure 5:
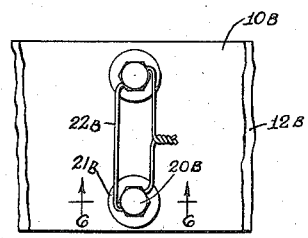
Fig. 5 is a fragmentary top plan view of another form of my invention.
Figure 6:
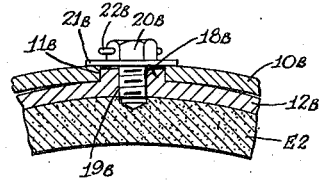
Fig. 6 is a sectional view taken substantially on the line 6—6 on Fig. 5.

In the form of my invention shown in Figs. 5 and 6, the band 10B has openings 11B therein located similarly to the openings 11A and the element E2 includes a composition body of either woven or felted material mounted on a suitable reenforcing back 12B. In this instance a pair of bosses 18B are unitary with the back 12B and project from the outwardly disposed face thereof substantially midway between the ends of the element and at locations such that when the element E2 is mounted on the band 10B the bosses 18B extend into the openings 11B. Tapped openings 19B are provided which extend into the back 12B through the bosses 18B and bolts 20B, which are either equipped with enlarged collars or which bear against washers 21B, are threaded into the tapped openings, the collars thereon or the washers 21B bearing on the outer face of the band 10B. The bolts 20B are tightened until the bosses 18B are properly mounted in the openings 11B. Then a wire 22B or other suitable means is threaded through openings in the heads of the bolts 20B and the ends of such means are intertwisted or otherwise connected whereby movement of the bolts 20B is prevented. Except in so far as the specific means of interconnection are concerned, the mounting and arrangement of elements as E2 on the band 10B is like the mounting of the elements as E1 on the band 10A and the elements E2 function in the same manner as the elements E1.

Figure 7:
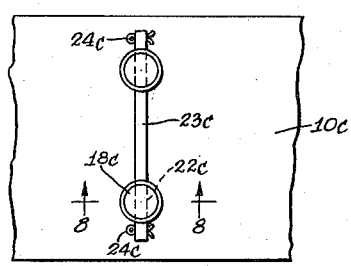
Fig. 7 is a fragmentary top plan view of still another form of my invention.
Figure 8:
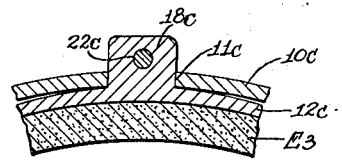
Fig. 8 is a sectional view taken substantially on the line 8—8 on Fig. 7.

In the form of my invention illustrated in Figs. 7 and 8, the band 10C has openings 11C therein located similarly to the openings 11A and 11B. The element E3 includes a composition body of either woven or molded material mounted on a suitable reenforcing back 12C which is equipped with bosses 18C that are positioned on the back 12C substantially midway between the ends of the element to extend through the openings 11C when the element E3 is to be connected to the band 10C, the bosses 18C projecting through the openings 11C beyond the outwardly disposed face of the band 10C. Openings 22C are provided in the bosses 18C in alignment with each other and a pin or bar 23C is passed through these openings which prevents displacement of the bosses 18C from the openings 11C, whereby the elements as E3 are connected to the band 10C to function in the same manner as the elements E2 and E1, the arrangement of the elements E3 on the band 10C being like the arrangement of the elements E1 on the band 10A. Cotter pins 24C or the like are provided at the ends of the bar 23C to prevent displacement thereof from the openings 22C.

It will be manifest from the foregoing description that this invention enables friction elements to be so secured in position that the elements may adjust themselves in their mountings to insure proper and positive seating thereof, whereby maximum efficiency may be realized and uniform wearing away in service is insured. Moreover, the invention enables the friction elements to be expeditiously mounted in position and also permits ready removal thereof when replacement is necessary or desired.

While I have illustrated and described selected embodiments of my invention, it is to be understood that these are capable of variation and modification and I therefore do not wish to be limited to the precise details set forth but desire to avail myself of such changes and alterations as fall within the purview of the following claims:

I claim:

1. In a device which has a supporting member movable toward and away from a member to be decelerated and which supporting member has an opening therein, the combination of a friction element including a composition body and a reenforcing back, said body and said back having aligned openings therein substantially midway between the ends of the element, the opening in the body being larger than the opening in the back, a securing member extended through the openings in the body, back and supporting member and including an enlarged head mounted in the opening in the body and engaged with the back, and means for preventing displacement of said securing member from said openings to thereby retain said element connected to said supporting member, the interconnection of the element and the supporting member and the element and the member being constructed and arranged to afford relative movement between the element and the supporting member.

2. In a device which has a supporting member movable toward and away from a member to be decelerated and which supporting member has an opening therein, the combination of a friction element including a composition body and a reenforcing back, said back having a boss thereon substantially midway between the ends of the element and extended into the opening in said supporting member, and means for preventing displacement of said boss from said opening to thereby retain said element connected to said supporting member, the interconnection of the element and the supporting member and the element and the member being constructed and arranged to afford relative movement between the element and the supporting member.

3. In a device which has a supporting member movable toward and away from a member to be decelerated and which supporting member has an opening therein, the combination of a friction element including a composition body and a reenforcing back, said back having a boss thereon substantially midway between the ends of the element and extended into the opening in said supporting member, means for preventing displacement of said boss from said opening to thereby retain said element connected to said supporting member, and means for retaining the displacement preventing means against displacement, the interconnection of the element and the supporting member and the element and the member being constructed and arranged to afford relative movement between the element and the supporting member.

4. In a device which has a circular member adapted to be decelerated and a band disposed about and movable toward and away from the periphery of said member, the combination of a friction element disposed between said member and band and comprising a face complementary to the periphery of said member to be seatable thereon upon movement of said band toward said member, means positioned intermediate the ends of said element for connecting the element to the band, and means for preventing displacement of the connecting means, the interconnecting of the element and the band and the element and the band being constructed and arranged to afford relative movement between the element and the band.

5. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, a pair of members disposed in said openings and connected to the element substantially midway between the ends thereof to secure said element to said band, and means for preventing displacement of said members, the interconnecting of the element and the band and the element and the band being constructed and arranged to afford relative movement between the element and the band.

6. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, said element including a composition body and a reenforcing back, said body and said back having a pair of openings extended therethrough and spaced one from the other correspondingly to the spacing of the openings in the band one from the other, the openings in the back being smaller than the openings in the body, a pair of securing members respectively extended through the openings in the body, back and band, each of said securing members comprising an enlarged head disposed in an opening in the body and engaged with the back, and means for preventing displacement of said securing members from said openings to thereby retain said element connected to said band, the interconnecting of the element and the band and the element and the band being constructed and arranged to afford relative movement between the element and the band.

7. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, said element including a composition body and a reenforcing back, said back having a pair of bosses projecting therefrom, said bosses being spaced one from the other correspondingly to the spacing of the openings in the band one from the other and being extendable into the openings in the band, and means for preventing displacement of said bosses from said openings to thereby retain said element connected to said band, the interconnecting of the element and the band and the element and the band being constructed and arranged to afford relative movement between the element and the band.

8. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, said element including a composition body and a reenforcing back, said back having a pair of bosses projecting therefrom, said bosses being spaced one from the other correspondingly to the spacing of the openings in the band one from the other and being extendable into the openings in the band, means for preventing displacement of said bosses from said openings to thereby retain said element connected to said band, and means for preventing displacement of the displacement preventing means, the interconnecting of the element and the band and the element and the band being constructed and arranged to afford relative movement between the element and the band.

9. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, said element including a composition body and a reenforcing back, said back having a pair of bosses projecting therefrom, said bosses being spaced one from the other correspondingly to the spacing of the openings in the band one from the other and being extendable into the openings in the band, said bosses and said back having openings therein, fastening means secured in the last-named openings for retaining said bosses in the openings in the band and the element connected to the band, and means for preventing displacement of said fastening means, the interconnecting of the element and the band and the element and the band being constructed and arranged to afford relative movement between the element and the band.

10. In a device which has a circular member adapted to be decelerated and a band disposed about and movable toward and away from the periphery of said member, said band having a pair of openings therein aligned with one another transversely of the band, said openings being spaced one from the other and from the edges of the band, the combination of a friction element disposed between said member and band and comprising a face complementary to the periphery of said member to be seatable thereon upon movement of said band toward said member, said element including a composition body and a reenforcing back, said back having a pair of bosses projecting therefrom, said bosses being spaced one from the other correspondingly to the spacing of the openings in the band one from the other and being extended through the openings in the band, said bosses having openings therein, and means extended through the openings in the bosses and held against displacement therefrom for retaining said element connected to the band, the interconnecting of the element and the band and the element and the band being constructed and arranged to afford relative movement between the element and the band.

11. In a device which has a supporting member movable toward and away from a member to be decelerated, the combination of a friction element, means positioned intermediate the ends of said element for connecting it to said supporting member, said element firmly engaging said supporting member adjacent said means and normally spaced from said supporting member at the ends of said element, and means for preventing displacement of the connecting means, the interconnection of the element and the supporting member and the element and the supporting member being constructed and arranged to afford relative movement between the element and the member.

12. In a device which has a supporting member movable toward and away from a member to be decelerated and which supporting member has an opening therein, the combination of a friction element, means connected to said element substantially midway between the ends thereof and extended through the opening in the supporting member for securing the element to the member, said element firmly engaging said supporting member adjacent said means and normally spaced from said supporting member at the ends of said element, and means for preventing displacement of the securing means, the interconnection of the element and the supporting member and the element and the member being constructed and arranged to afford relative movement between the element and the supporting member.

13. In a device which has a supporting member movable toward and away from a member to be decelerated, a friction element, means arranged intermediate the ends of said element for connecting it to said supporting member, portions of said element adjacent said means firmly engaging said supporting member and said element normally spaced from said supporting member between said engaging portions and the ends of the element.

14. In a device which has a supporting member movable toward and away from a member to be decelerated, a friction element, means arranged intermediate the ends of said element for connecting it to said supporting member, portions of said element adjacent said means firmly engaging said supporting member and said element normally spaced from said supporting member between said engaging portions and the ends of the element in gradually increasing degree toward the ends of said element.

15. In a device which has an arcuate supporting member movable toward and away from the periphery of a cylindrical member to be decelerated, an arcuate friction element, means for securing said element to said supporting member, the face and back of said element having substantially the same radii as the member to be decelerated, and the face of said supporting member normally having a radius greater than the radius of the member to be decelerated.

WILLIAM A. BLUME.